(12) United States Patent
Yu

(10) Patent No.: US 7,043,947 B1
(45) Date of Patent: May 16, 2006

(54) AUTOMOBILE STEERING WHEEL LOCK

(75) Inventor: Chien-Ho Yu, Yung Kang (TW)

(73) Assignee: Jin Shan Die Casting Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 11/107,976

(22) Filed: Apr. 18, 2005

(51) Int. Cl.
*B60R 25/02* (2006.01)
(52) U.S. Cl. .................................................. 70/209
(58) Field of Classification Search ............. 70/209, 70/211, 212, 225, 226, 238, 19
See application file for complete search history.

(56) References Cited

U.S. PATENT DOCUMENTS

| | | | | |
|---|---|---|---|---|
| 5,014,529 A * | 5/1991 | Wu | ............. | 70/209 |
| 5,095,723 A * | 3/1992 | Lin | ............. | 70/209 |
| 5,138,853 A * | 8/1992 | Chen | ............. | 70/209 |
| 5,174,138 A * | 12/1992 | Shen | ............. | 70/209 |
| 5,255,544 A * | 10/1993 | Wu | ............. | 70/209 |
| 5,347,836 A * | 9/1994 | Chen | ............. | 70/209 |
| 5,457,972 A * | 10/1995 | Lo | ............. | 70/209 |
| 5,636,537 A * | 6/1997 | Chen | ............. | 70/209 |
| 5,755,124 A * | 5/1998 | Chang | ............. | 70/209 |
| 5,836,185 A * | 11/1998 | Openiano | ............. | 70/209 |
| 6,378,343 B1 * | 4/2002 | Lee | ............. | 70/209 |
| 6,668,604 B1 * | 12/2003 | Hsieh | ............. | 70/209 |
| 6,679,089 B1 * | 1/2004 | Moreton | ............. | 70/209 |
| 2002/0095959 A1 * | 7/2002 | Meekma et al. | ............. | 70/209 |
| 2003/0074934 A1 * | 4/2003 | Moreton | ............. | 70/209 |

* cited by examiner

*Primary Examiner*—Lloyd A. Gall

(57) ABSTRACT

An automobile steering wheel lock includes a stationary base, a movable constrict base, an insert pin, a helical spring, and a locking member. A key can unlock the lock by rotating a rotary member of the locking core, with a projecting member of the lock core leaving out of an insert hole of the stationary base so that the helical spring recovers, pushing the insert pin and the lock core outward. Then the insert pin separates from the insert hole of a telescoping rod of the constrict base, and the constrict base is pushed off a section of the steering wheel, thus this lock is unlocked. If the lock core is pushed in the stationary base, with the projecting member fitted in the insert hole of the stationary base, and with the insert pin fitting in the insert hole of the telescoping rod, thus this lock is locked.

1 Claim, 6 Drawing Sheets

AUTOMOBILE STEERING WHEEL LOCK

BACKGROUND OF THE INVENTION

1. Field of the Invention

This invention relates to an automobile steering wheel lock, particularly to one possible to lock on a section of the steering wheel by fitting a stationary base around an outer surface of a section of a steering wheel of an automobile and pushing a movable constrict base to the stationary base and fitting around on an inner surface of the section of the steering wheel. Then a lock core is pushed in a lock housing at one side of the stationary base to let an insert pin shift inward to fit in an insert hole of the telescoping rod of the movable constrict base to keep the telescoping rod of the movable constrict base immovable so as to lock this lock.

2. Description of the Prior Art

A conventional automobile steering wheel lock shown in FIG. 1, includes a body member 1 with a hook 10 extending down, a locking member 11 fixed on an upper end of the body member 1, a grip 12 fixed on a lower end of the body member 1, an opening 13 at the upper end of the body member 12, an elongate rod member 14 extending in the body member 14 through the opening 13 and having a hook 15 formed on the lower end and a plurality of continual annular grooves 16 formed on a section near the lower end.

In using the conventional automobile steering wheel lock, it is placed on the steering wheel, with the hook 10 hooking an inner surface of one section of the steering wheel. Next, the elongate rod member 14 is pulling out of the body member 1, letting the hook 15 hooking the inner surface of the opposite section of the steering wheel. Then the body member 1 has its outer end or the grip 12 extending to the direction between the steering wheel and the driver's seat, restricting the steering wheel from rotated for attaining the anti-theft function.

Nevertheless, if a thief uses a tool such as a hammer, striking the elongate rod member 14 or the body member 1, the engaging pin in the locking member 11 may be damaged and loses the anti-theft function.

SUMMARY OF THE INVENTION

The feature of the invention is a stationary base with a fitting semicircular member and a movable constrict base with a fitting semicircular member for wrapping a section of the steering wheel of an automobile, and a lock core together with an insert pin fitted around by a helical spring movably contained in a lock housing formed at a side of the stationary base. Then the lock core is pushes inward to also shift the insert pin to insert through the insert hole in a telescoping rod of the movable constrict base and with its lower end fitting in a hole of the stationary base to keep the movable constrict base immovable, in other words, this lock is locked on the steering wheel. In unlocking, a key is inserted in a rotary member of the lock core and turned for a certain angle to rotate the rotary member to let the lock core separate from the lock housing and accordingly let the insert pin retreat from the hole of the stationary base so that the movable constrict base with the telescoping rod may be pulled outward off a section of the steering wheel, and this lock is unlocked.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
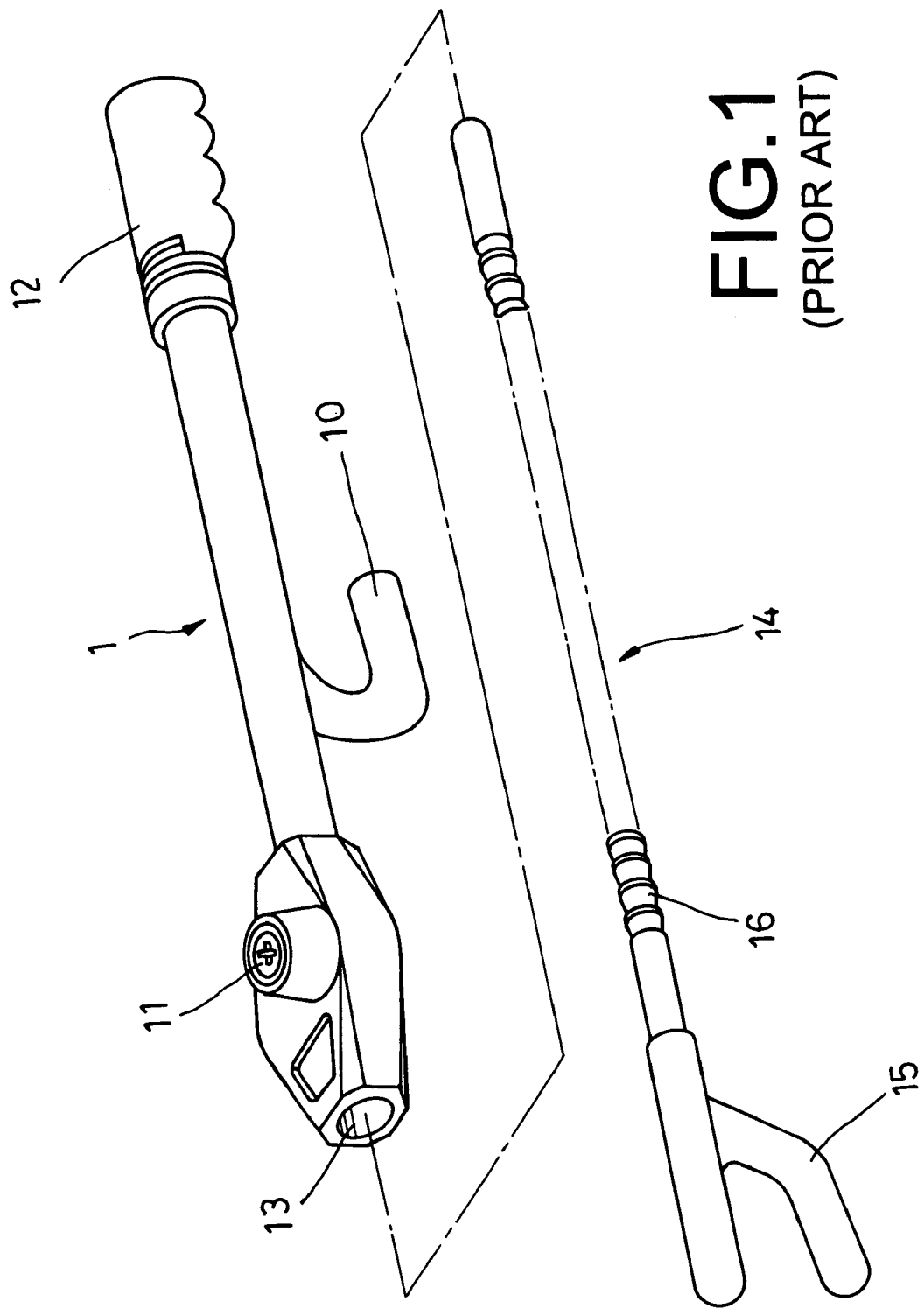
FIG. 1 is a perspective view of a conventional automobile steering wheel lock.
Figure 2:
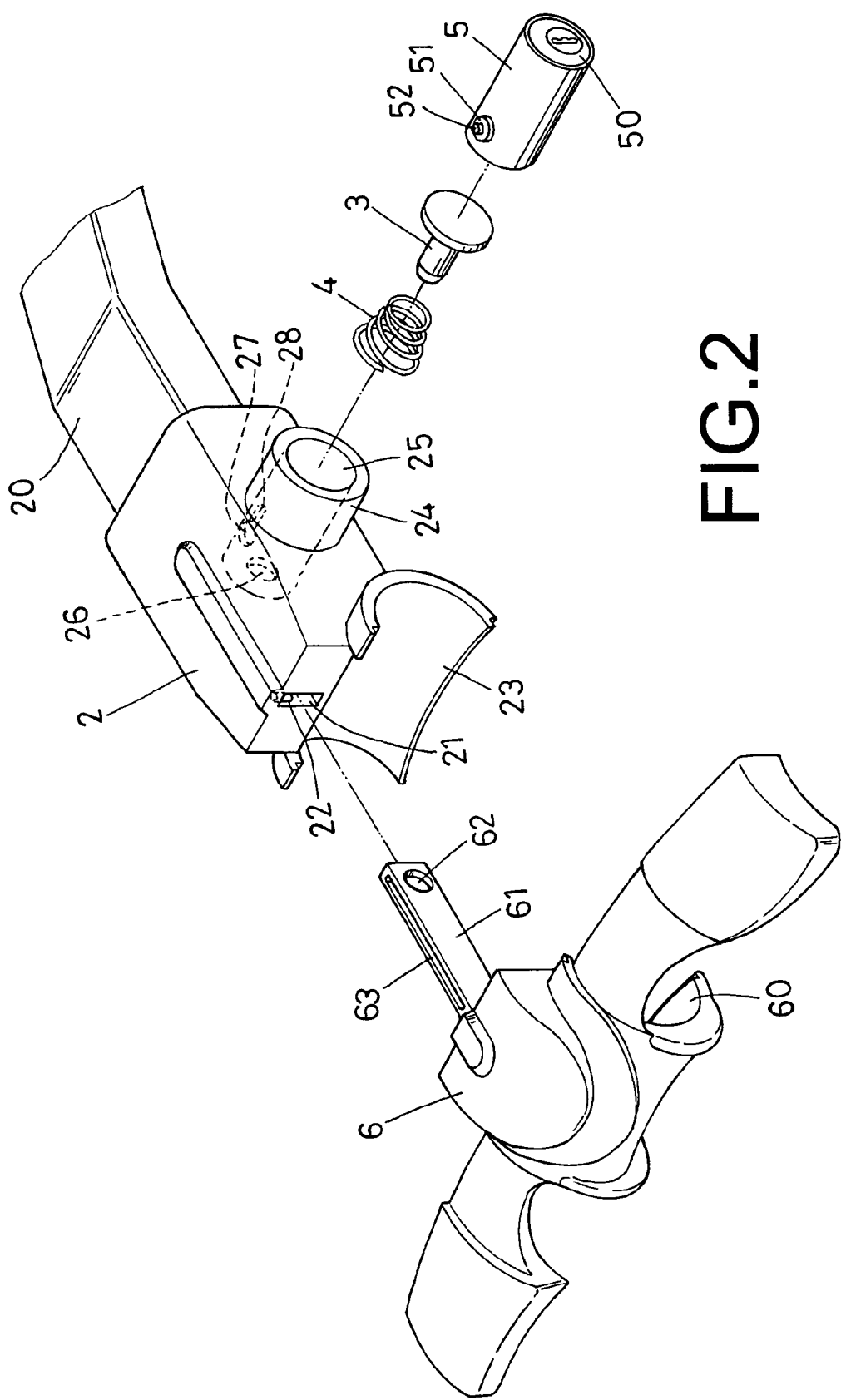
FIG. 2 is an exploded perspective view of an automobile steering wheel lock in the present invention.
Figure 3:
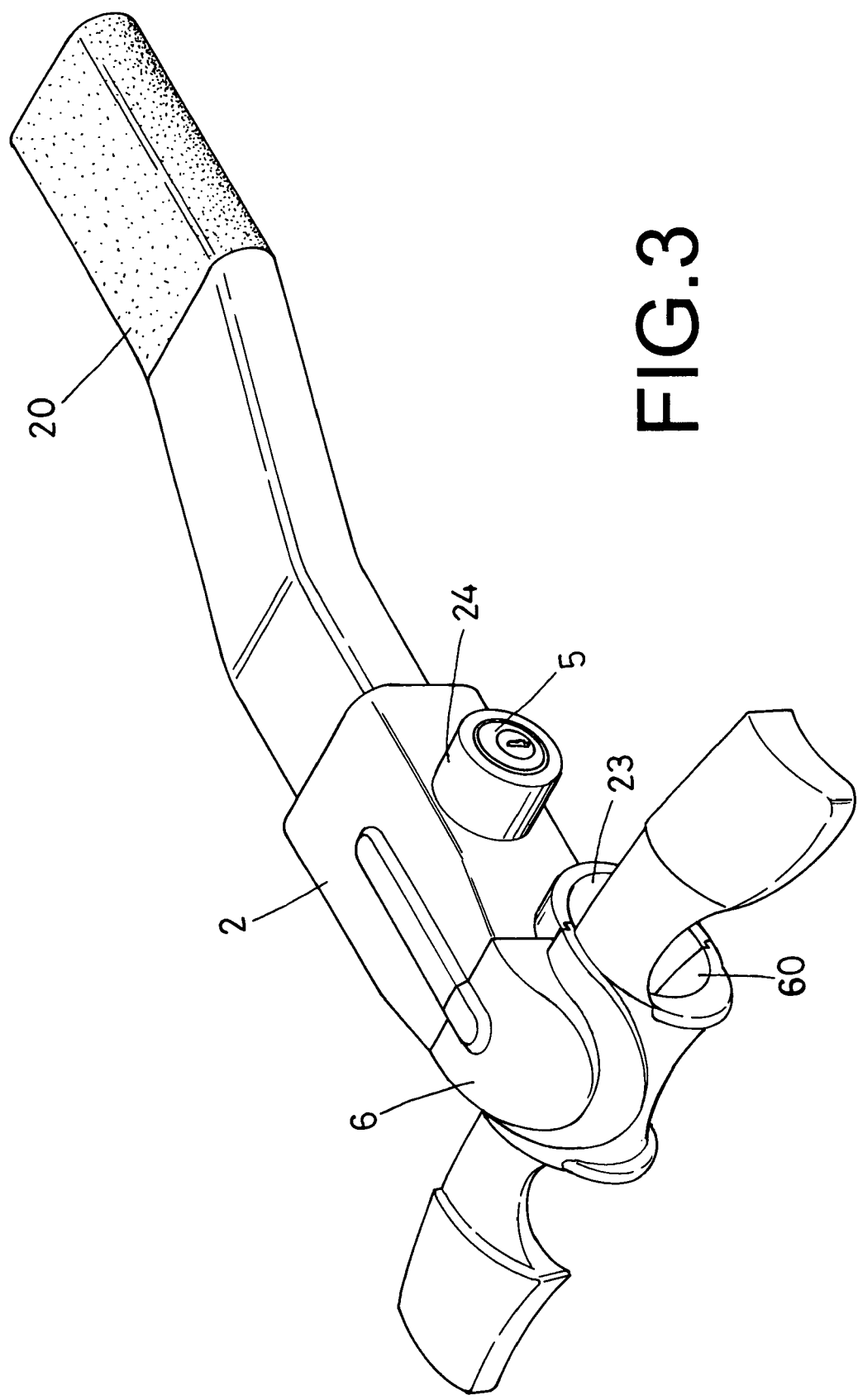
FIG. 3 is a perspective view of the automobile steering wheel lock in the present invention.
Figure 4:
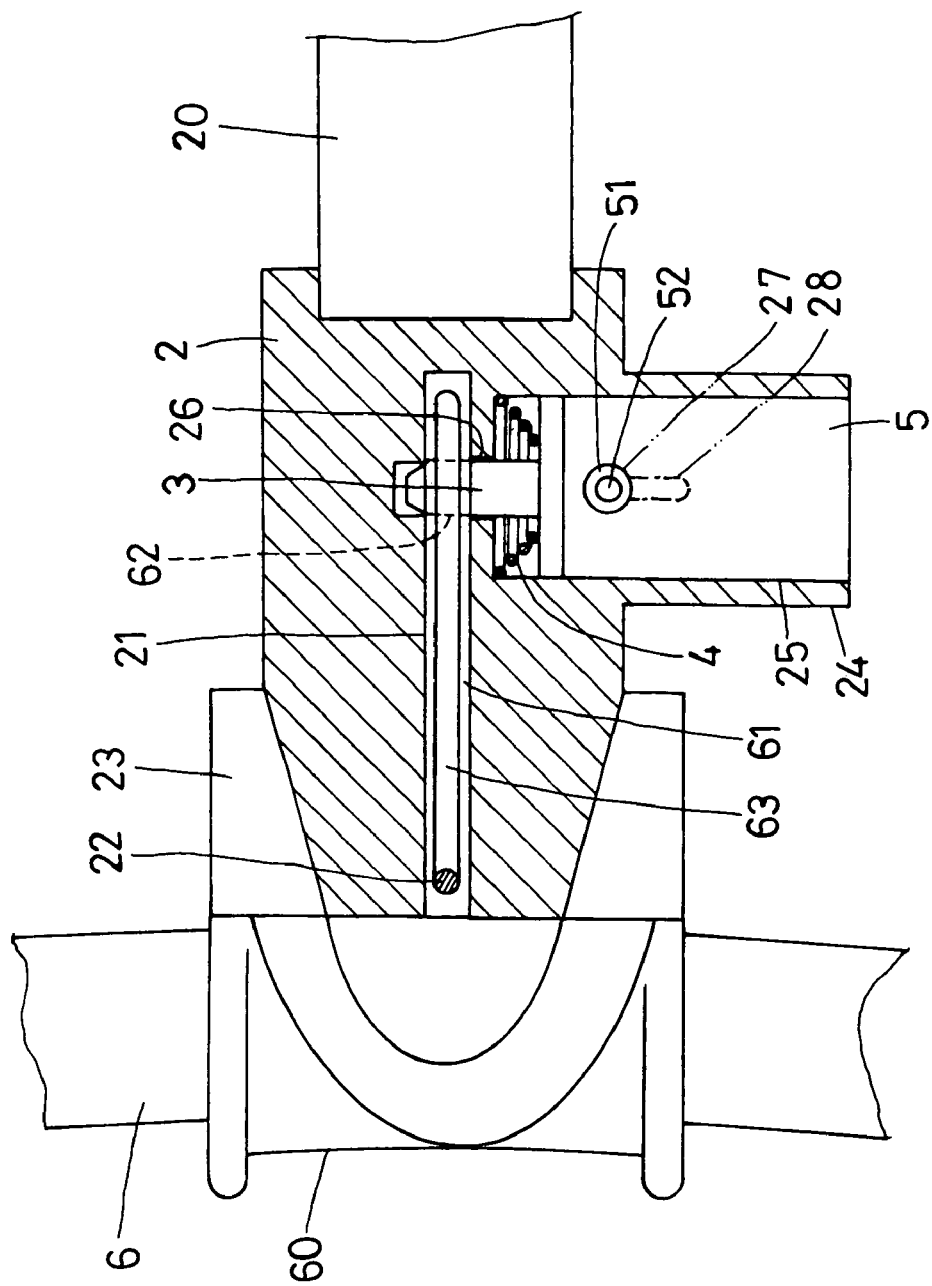
FIG. 4 is a cross-sectional view of the automobile steering wheel lock under a locked condition in the present invention.

A preferred embodiment of an automobile steering wheel lock in the present invention, as shown in FIGS. 2, 3 and 4, includes a stationary base 2, an insert pin 3, a helical spring 4, a locking core 5 and a movable constrict base 6, as main components.

The stationary base 2 has a stop rod 20 in a rear portion, a slot 21 extending lengthwise in a front portion and having an opening in the front end, a stop pin 22 vertically fixed in the front end of the slot 21, a semicircular fitting member 23 formed downward in the front, a lock housing 24 formed on a vertical side and having an hollow interior 25, a hole 26 bored in the bottom wall of the hollow interior 25 and communicating with the slot 21, a fitting hole 27 bored in an inner upper surface of the lock housing 24 and connected with a slide groove 28 formed also in the upper surface.

The insert pin 3 with a large head is fitted in the hollow interior 25 of the lock housing 24.

The helical spring 4 is fitted around the pin 3 and in the hollow interior 25 of the lock housing 24.

The locking core 5 is also fitted in the hollow interior 25 of the lock housing 24, having a rotary member 50 lengthwise in the center portion, and a projecting member with a small protruding point 52 formed on an outer surface of a front-end portion.

The movable constrict base 6 is located in front of the stationary base 2, having a semicircular fitting member 60 extending laterally in a lower portion to correspond to the semicircular fitting member 23 and a telescoping rod 61 formed to extend rearward from the center portion and having an insert hole 62 in an rear end and an elongate slide groove 63 in an upper surface.

In assembling, referring to FIGS. 2, 3 and 4, firstly, the helical spring 4 is fitted around the insert pin 3, and then the insert pin 3 together with the spring 4 is placed in the hollow interior 25 of the lock housing 24. And then the projecting member 51 of the locking member 5 is fitted in the insert hole 27 in the hollow interior 25, and then the telescoping rod 61 of the movable constrict base 6 is inserted in the slot 21 of the base 2. Then the stop pin 22 is fixed in the slot 21, also inserted securely in the elongate slide groove 63 of the telescoping rod 61 in place. Thus, the telescoping rod 61 cannot fall off the slot 21 by means of the stop pin 22 stoppable by the two ends of the groove 63, finishing the assembling of this steering wheel lock.

Figure 5:
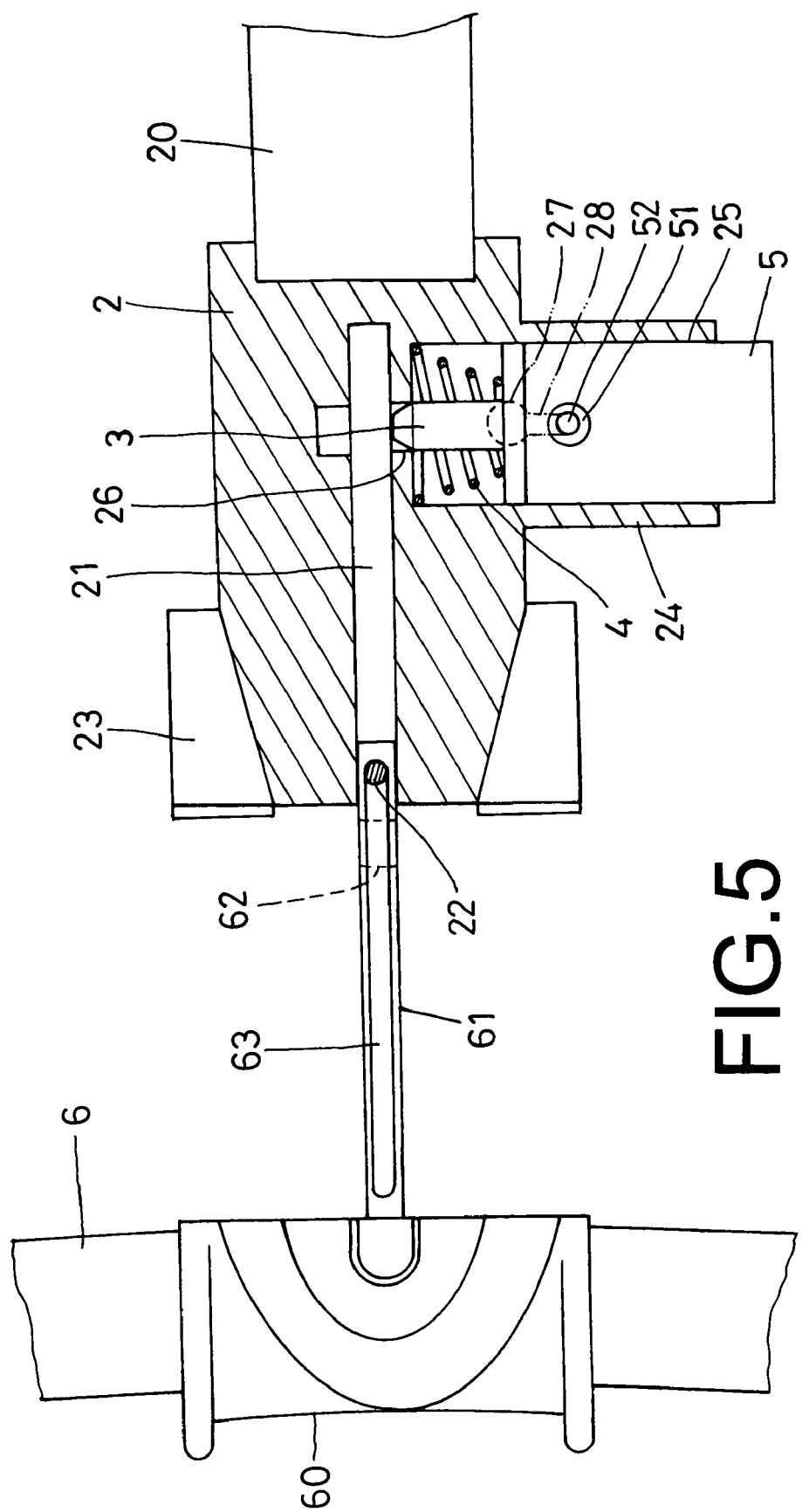
FIG. 5 is a cross-sectional view of the automobile steering wheel lock under an unlocked condition in the present invention; and, FIG. 6 is a perspective view of the automobile steering wheel lock in the present invention, showing it locked on the steering wheel of an automobile.
Figure 6:
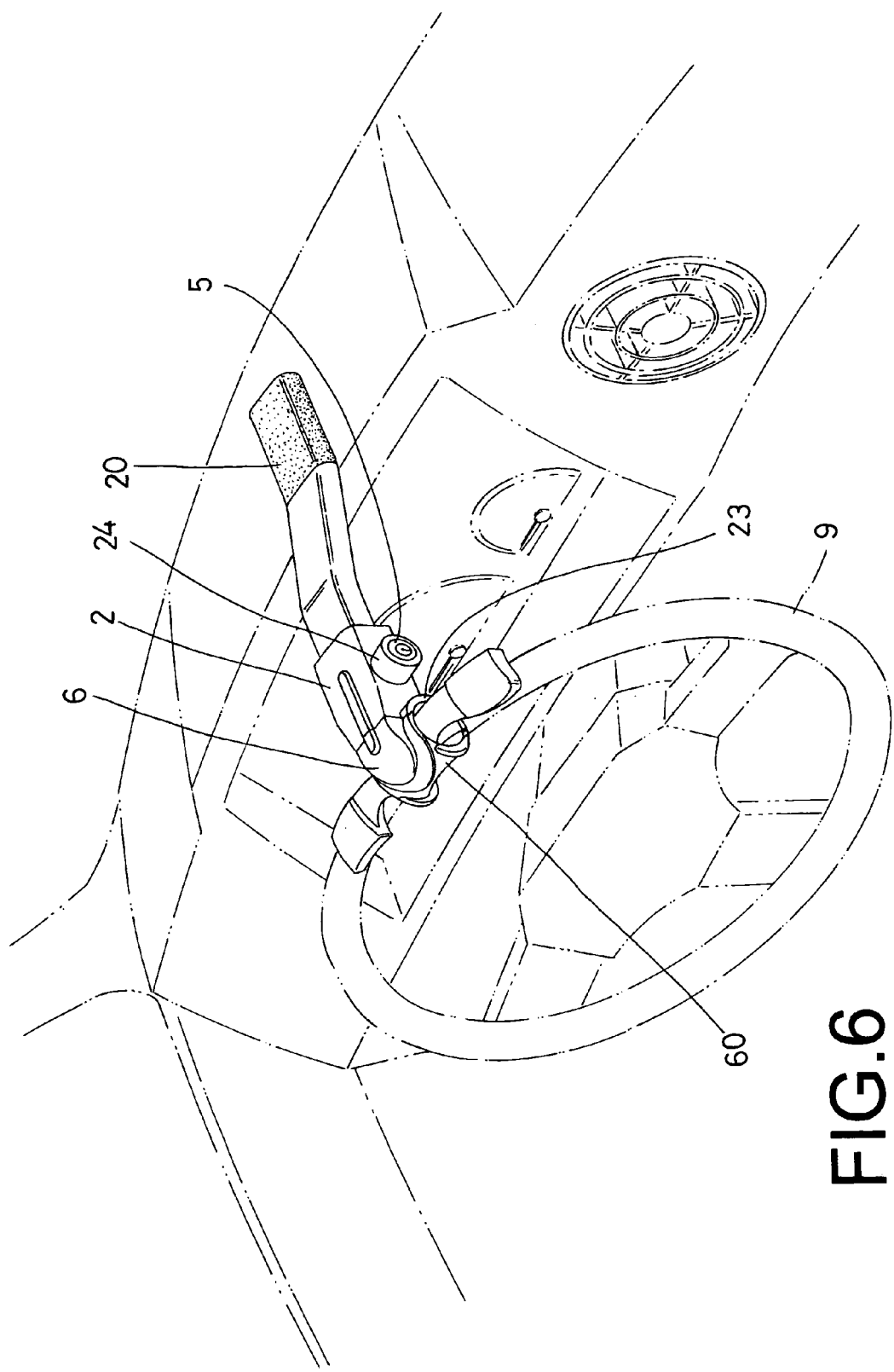

In using, referring to FIGS. 5 and 6, a key is inserted in the rotary member 50 of the locking member 5 and turned for a preset angle to make the projecting member 51 shrink inward to separate from the insert hole 27. Then the helical spring 4 recovers its elasticity to push the insert pin 3 outward so that the locking core 5 may be moved to expose a little out of the lock housing 24, with the projecting member 51 sliding along the slide groove 28, and with the insert pin 3 retreating and moving out of the insert hole 62 of the telescoping rod 61. Then the movable constrict base 6 with the telescoping rod 61 can be pulled out of the slot 21, with the fitting member 60 moving outward farther from the fitting member 23 of the base 2, and with the telescoping rod 61 stopped by the stop pin 22 contacting with the outer end of the slide groove 63 and impossible to separate from the stationary base 2. Then the steering wheel lock can be placed on a section of the steering wheel 9 of an automobile, with the fitting member 23 of the base 2 fitted on an outer surface of the steering wheel 9, and with the stop rod 20 resting on the upper surface of a dashboard. Then the movable constrict base 6 is shifted toward the stationary base 2, with the telescoping rod 61 moving inward in the slot 21 of the stationary base 2 until the fitting member 60 fitting around an inner surface of the section of the steering wheel 9 so that the two fitting members 23 and 60 wrap completely around that section of the steering wheel 9 for preventing the steering wheel from rotated after locked, with the insert hole 62 aligned to the hole 26 communicating with the slot 21. Then the locking core 5 is pushed into the hollow interior 25 of the lock housing 24, with the small protruding point 52 of the projecting member 51 sliding along the slide groove 28 until the projecting member 51 fits in the insert hole 27, and the insert pin 3 is also shifted inward compressing the helical spring 4 at the same time until the outer end of the insert pin 3 inserts through the insert hole 62, securing stably the telescoping rod 61 at the location shown in FIG. 4. Then the steering wheel lock is locked totally, obtaining the anti-theft effect, and very simple to handle.

While the preferred embodiment of the invention has been described above, it will be recognized and understood that various modifications may be made therein and the appended claims are intended to cover all such modifications that may fall within the spirit and scope of the invention.

What is claimed is:

1. An automobile steering wheel lock comprising:
   a stationary base having a stop rod formed in a rear portion, a slot formed lengthwise in a front center portion, a fitting member of a semicircular shape formed laterally in the front end, a lock housing formed to extend sidewise at a vertical side, said lock housing having a hollow interior, a hole formed in a bottom wall of said hollow interior and communicating with said slot;
   an insert pin positioned in a hollow chamber of said lock housing;
   a helical spring fitted around said insert pin;
   a locking core movably positioned in said hollow interior of said lock housing and having a rotary member; and,
   a movable constrict base movably located in front of said stationary base, having a semicircular fitting member to correspond to said fitting member of said stationary base and a telescoping rod formed in a rear portion bored with an insert hole in its outer end;
   wherein a stop pin is fixed at a front end of said slot of said stationary base, and an elongate slide groove is formed in an upper surface of said telescoping rod of said movable constrict base;
   wherein said hollow interior of said lock housing of said stationary base is provided with an insert hole in its wall, and a slide groove is provided to connect with said insert hole, and said locking core has a projecting member with a small protruding point on its outer surface to fit in or leave out of said insert hole of said stationary base.

* * * * *